United States Patent [19]

Auslander et al.

[11] Patent Number: 4,589,065
[45] Date of Patent: May 13, 1986

[54] MECHANISM FOR IMPLEMENTING ONE MACHINE CYCLE EXECUTABLE TRAP INSTRUCTIONS IN A PRIMITIVE INSTRUCTION SET COMPUTING SYSTEM

[75] Inventors: Marc A. Auslander, Millwood; John Cocke, Bedford; Hsieh T. Hao, Chappaqua; Peter W. Markstein, Yorktown Heights; George Radin, Piermont, all of N.Y.

[73] Assignee: International Business Machines Corporation, Armonk, N.Y.

[21] Appl. No.: 509,733

[22] Filed: Jun. 30, 1983

[51] Int. Cl.⁴ .............................................. G06F 9/00
[52] U.S. Cl. ................................................... 364/200
[58] Field of Search ................. 364/200 MS File, 300

[56] References Cited

U.S. PATENT DOCUMENTS 4,074,353 2/1978 Woods et al. ...................... 364/200

Primary Examiner—Raulfe B. Zache
Attorney, Agent, or Firm—Roy R. Schlemmer

[57] ABSTRACT

A mechanism for performing a run-time storage address validity check within one machine cycle. The mechanism, functioning together with an intelligent compiler, eliminates the need for hardware implementation of a storage validity check. More particularly, the mechanism performs its function in one machine cycle in the event that a trap exception does not cause an interrupt. In the rare instance when an interrupt is necessary, a number of machine cycles will be impacted. The mechanism comprises a minimum amount of logic circuitry for determining the trap condition operating in conjunction with conventional, previously existing compare, branch instruction testing, and interrupt generation circuitry.

7 Claims, 7 Drawing Figures

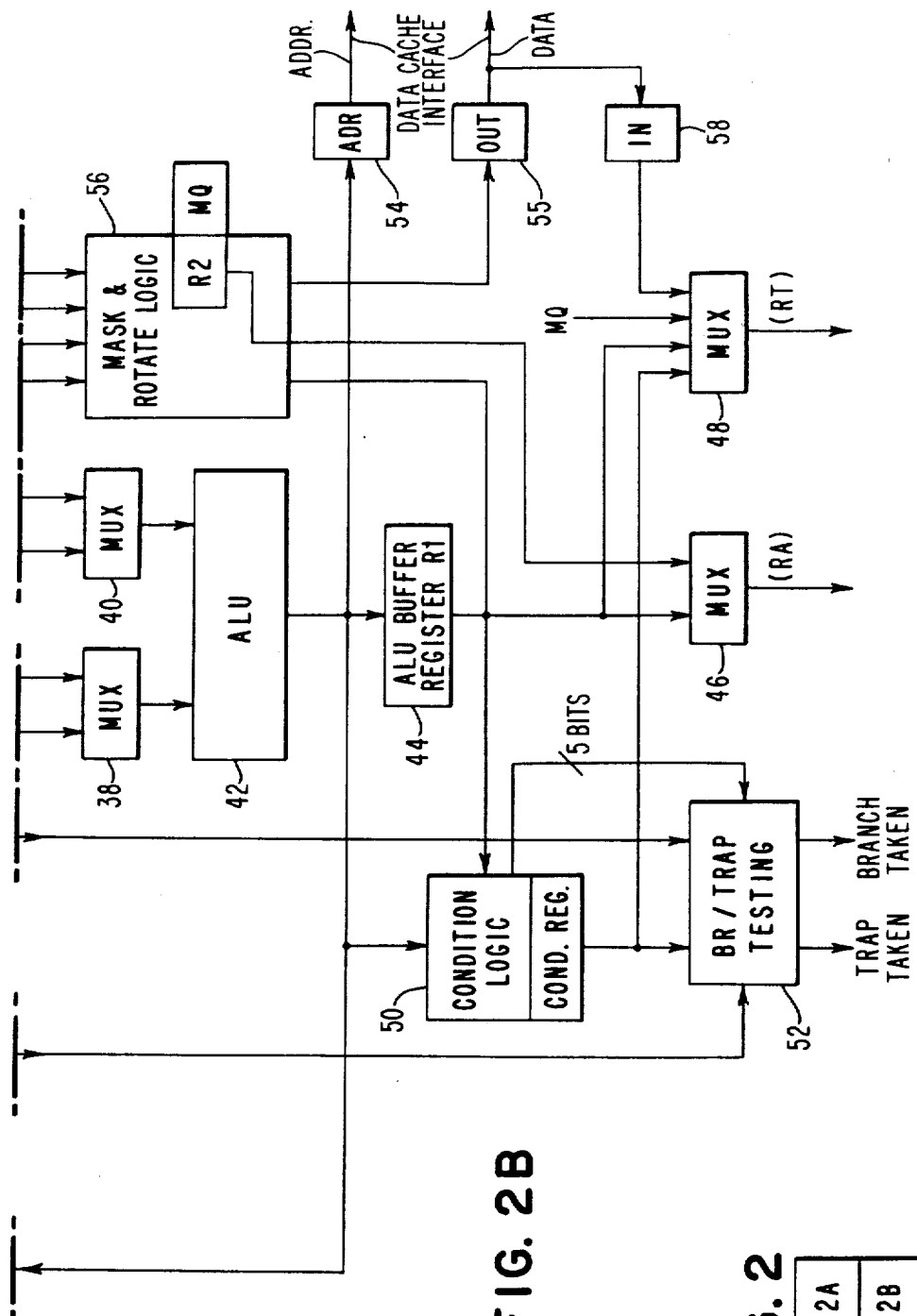

FIG. 4.1
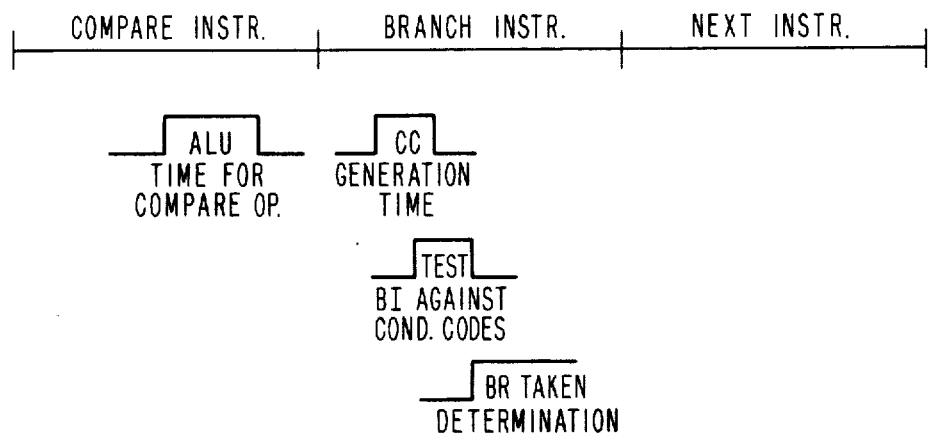
FIG. 4.2
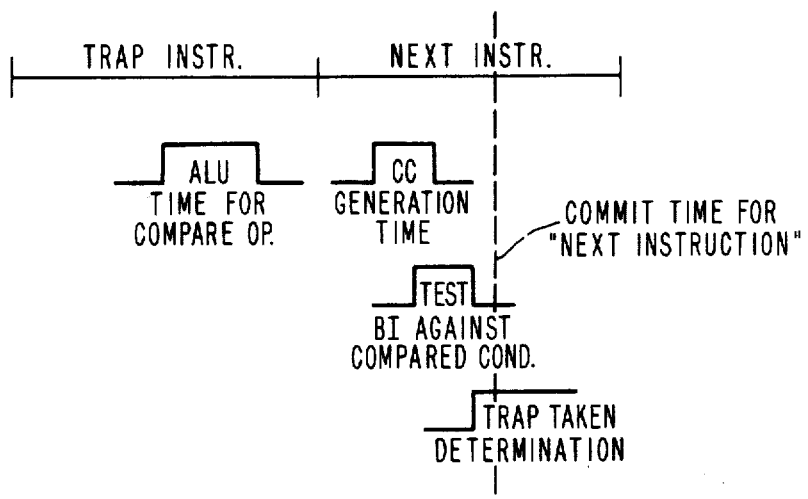

MECHANISM FOR IMPLEMENTING ONE MACHINE CYCLE EXECUTABLE TRAP INSTRUCTIONS IN A PRIMITIVE INSTRUCTION SET COMPUTING SYSTEM

BACKGROUND OF THE INVENTION

FIELD OF THE INVENTION

The present invention has particular utility in a reduced instruction set computer architecture, two examples of which are described in considerable detail, as to their basic architectural features as well as overall design consideration, in the two articles (1) "The 801 Minicomputer," by George Radin and (2) "RISC I: A reduced Instruction Set VLSI Computer," by Patterson and Sequin. The complete bibliographic data for these two articles is set forth more fully in the subsequent Prior Art section.

Current developments in the semiconductor industry indicate that very large-scale integration (VLSI) affords microprocessor designers two conflicting approaches to designing future systems. The first is that they can continue the current trend, where VLSI is used to build increasingly complex microprocessors, where greater complexity is exhibited as more hardware to do functions previously done by software alone. Alternatively, they can take the opposite approach and build simpler, very fast processors, where more functions are done by software. This second approach is exemplified in the two above-referenced articles.

Greater complexity lets designers use ever-cheaper VLSI circuits in place of increasingly expensive and processor time consuming software. What's more, the takeover of many software functions by hardware is said to help programmers develop high-level language (HLL) programs that are shorter, more efficient, and easier to write, compile and debug. More complex systems would, in theory, reduce the high cost of developing software and thus reduce the total life-cycle cost of a system.

Thus, system designers following the first approach, increase the complexity of architectures commensurate with the increasing potential of implementation technologies, as exemplified by the complex successors of simpler machines. Compare, for example, VAX 11 to PDP-11, IBM System/38 to IBM System/3, and Intel APX-432 to 8086. The consequences of this complexity are increased design time, an increased potential for design errors and inconsistent implementations. This class of computers has been referred to in the literature as complex instruction set computing (CISC) systems.

As indicated previously in the above referenced article "The 801 Minicomputer" by G. Radin a coinventor of the present invention, a unique approach to overall CPU architecture has been realized following the second of the two previously mentioned approaches to architecture design, i.e., a reduced instruction set computer. The heart of such a system architecture is its CPU. Most of the aspects of this system are designed to make available to the user the fundamental power of the underlying CPU. The overall organization is somewhat different from more conventional CPUs.

There will now follow a brief overall description of the CPU design strategy utilized in the CPU of the Radin article followed by a more specific description of the details of the CPU insofar as is deemed necessary to provide a basis for understanding how the present invention fits into the overall system architectural scheme.

Conventional CPUs for general purpose systems in the middle range of cost are organized as hardwired microprocessors "interpreting" the architecture of the CPU. Thus the execution of a CPU instruction normally requires the execution of several "microinstructions" which normally reside in a high-speed memory called a "control store." The number of such microinstructions (or "machine cycles") required to execute an average CPU instruction depends on the power (hence cost) of the underlying microprocessor, the complexity of the CPU architecture, and the application being run (i.e., the instruction mix). Typically, for instance, an IBM S/370 model 168 will require 3–6 cycles per S/370 instruction, a model 148 will take 10–15 and a S/360 model 30 will need over 30 cycles.

Very sophisticated S/370 CPU designs have demonstrated the possibility of approaching one machine cycle per instruction by using techniques of look-ahead, parallel execution and keeping branch histories.

Instruction mixes for different application types show differences in frequency of execution of instructions. For instance, scientific applications will use the S/370 floating point instructions and commercial applications will use decimal arithmetic. But, especially when an entire running system is traced instead of just the application code, there is a remarkable similarity in the list of most popular instructions. Moreover, these tend to be rather simple functions, such as load, store, branch, compare, integer arithmetic, logic shifting. These same functions generally are found to be in the instruction repertoire of the underlying microprocessor. Thus, for these functions, it was considered wasteful to pay the interpretive overhead necessary when the micro-architecture does not precisely match the CPU architecture.

Therefore, the primitive instruction set designed for the subject primitive reduced instruction set machine system may be directly executed by hardware. (In the subsequent description, the acronym PRISM will be used instead of the full expression PRimitive Instruction Set Machine for convenience of reference.) That is, every primitive instruction takes exactly one machine cycle. Complex functions are implemented in "microcode" just as they are in conventional CPUs, except that in the present system this microcode is just code; that is, the functions are implemented by software subroutines running on the primitive instruction set.

The advantages of micro-code that accrue because it resides in high-speed control store virtually disappears with a memory hierarchy in which the cache is split into a part that contains data and a part that contains instructions. The instruction cache acts as a "pageable" control store because frequently-used functions will, with very high probability, be found in this high-speed memory. The major difference is that in a conventional CPU the architect decides in advance which functions will most frequently be used across all applications. Thus, for instance, double precision floating point divide always resides in high speed control store while the First Level Interrupt Handler may be in main memory. With an instruction cache it is recent usage that decides which functions will be available more quickly.

With this approach, the number of cycles required to do a particular job is at worst no more than on a conventional (low-to-moderately priced) CPU in which the complex instructions have been microprogrammed. But by carefully defining the primitive instructions to be an excellent target machine for the compiler, it has been found that far fewer cycles are actually required. In fact, for systems programs, fewer instructions are required than S/370 instructions.

Most instruction mixes show that between 20% and 40% of instructions go to storage to send or receive data, and between 15% and 30% of instructions are branches. Moreover, for many applications, a significant percent of the memory bandwidth is taken for I/O. If the CPU is forced to wait many cycles for storage access its internal performance will be wasted.

The second major goal of the present (PRISM) system design, therefore, was to organize the storage hierarchy and develop a system architecture to minimize CPU idle time due to storage access. First, it was clear that a cache was required whose access time was consistent with the machine cycle of the CPU. Secondly a "store-in-cache" strategy was used (instead of "storing through" to the backing store) so that the 10% to 20% of expected store instructions would not degrade the performance severely. (For instance, if the time to store a word is ten cycles, and 10% of instructions are stores, the CPU will be idle about half the time unless it can overlap execution of the instructions following the store.)

But a CPU organization which needs a new instruction at every cycle as well as accessing data every third cycle will be degraded by a conventional cache which delivers a word every cycle. Thus the cache was split into a part containing data and a part containing instructions. In this way the bandwidth to the cache was effectively doubled and asynchronous fetching of instructions and data from the backing store was permitted.

Conventional architectures make this decision difficult because every store of data can be a modification of an instruction, perhaps even the one following the store. Thus the hardware must ensure that the two caches are properly synchronized, a job that is either expensive or degrading, or (generally) both. Even instruction prefetch mechanisms are complex since the effective address of a store must be compared to the Instruction Address Register.

It has been found, however, that as soon as index registers were introduced into computers the frequency of instruction modification fell dramatically, until today, instructions are virtually never modified. Therefore, the PRISM architecture does not require this hardware broadcasting. Instead it exposes the existence of the split cache and provides instructions by which software can synchronize the caches when required, which is only in such functions as "program fetch."

Similarly, in conventional systems in which the existence of a cache is unobservable to the software, I/O must (logically) go through the cache. This is often accomplished in less expensive systems by sending the I/O physically through the cache.

The result is that the CPU must wait while the I/O proceeds, and that after an I/O burst the contents of the cache no longer reflect the working set of the process being executed, forcing it back into transient mode. Even in expensive systems a broadcasting or directory-duplication strategy may result in some performance degradation.

It was noted that responsibility for the initiation of I/O in current systems was evolving toward system access methods using fixed block transfers and a buffer strategy which normally moved data between subsystem buffers and user areas (e.g., IMS, VTAM, VSAM, paging). This implies that the access method knows the location and extent of the buffer and knows when an I/O transfer is in process. Thus this software can properly synchronize the caches, and the "channel" (Direct Memory Adapter in the PRISM system) can transmit directly to and from the backing store. The result of this system approach is that even when half of the memory bandwidth is being used for I/O the CPU is virtually undegraded.

Notice that in all of the preceding discussions an underlying strategy is being applied. Namely, wherever there is a system function which is expensive or slow in all its generality, but where software can recognize a frequently occurring degenerate case (or can move the entire function from run time to compile time) that function is moved from hardware to software, resulting in lower cost and improved performance.

One interesting example of the application of this overall design strategy concerns managing the cache itself. In the PRISM system the cache line is 32 bytes and the largest unit of a store is four bytes. In such a cache, whose line size is larger than the unit of a store and in which a "store in cache" approach is taken, a store directed at a word which is not in the cache must initiate a fetch of the entire line from the backing store into the cache. This is because, as far as the cache can tell, a load of another word from this line might be requested subsequently. Frequently, however, the store is simply the first store into what, to the program, is newly acquired space. It could be temporary storage on a process stack (e.g., PL/I Automatic) just pushed on procedure call; it could be an area obtained by a Getmain request; or it could be a register store area used by the First Level Interrupt Handler. In all of these cases the hardware does not know that no old values from that line will be needed, while to the software this situation is quite clear.

Accordingly, an instruction has been defined in the PRISM system called SET DATA CACHE LINE, which instructs the cache to establish the requested line in its directory but not to get its old values from the backing store. (Thus, after execution of this instruction, the values in this line will be whatever happened to be in the cache at the time.) If this instruction is executed whenever fresh storage is acquired unnecessary fetches from the backing store will be eliminated. (On the other hand, the execution of the instruction for each new line itself adds CPU cycles. Performance modelling on specific hardware configurations running specific applications will indicate the best tradeoff.)

Similarly when a scratch storage area is no longer needed, executing the instruction INVALIDATE DATA CACHE LINE will turn the "changed" bit off in the cache directory entry corresponding to the named line, thus eliminating an unnecessary storeback. (See copending PCT Application Serial No. U.S. 82/01830).

The above general discussion of the PRISM features which result in overlapped access to the cache between instructions and data, overlapped backing store access among the caches and I/O, less hardware synchronizing among the caches and I/O, and techniques to improve the cache hit ratios, indicates the overall flavor of the PRISM design objectives.

However, to fully realize the potential objectives of the PRISM system's overall design approach, it has been found advantageous to include certain hardware modifications whereby a number of powerful one-machine cycle executable instructions are available. Five of these architectural features are set forth and described in the present application and the four co-pending related patent applications:

| U.S. Pat. Serial No. | 509,744 |
| U.S. Pat. Serial No. | 509,734 |
| U.S. Pat. Serial No  | 509,836 |
| U.S. Pat. Serial No. | 566,925 |

RELATED U.S. PATENT APPLICATIONS

The subject application is related to other copending applications having different inventorship entities and owned by the same assignee as the present application. These other applications:

(1) U.S. patent application Ser. No. 509,744, entitled "Condition Register Architecture for a Primitive Instruction Set Machine," by M. A. Auslander, J. Cocke, H. Hao, P. W. Markstein and G. Radin.

(2) U.S. patent application Ser. No. 509,734, entitled "Mechanism for Implementing One Machine Cycle Executable Branch-On-Bit-In-Any-Register Instructions in a Primitive Instruction Set Computing System," by M. A. Auslander, H. Hao, M. Hopkins, P. W. Markstein, G. Radin and W. S. Worley.

(3) U.S. patent application Ser. No. 509,836, entitled "Mechanism for Implementing One Machine Cycle Executable Mask and Rotate Instructions in a Primitive Instruction Set Computing System," by H. Hao, P. W. Markstein and G. Radin.

(4) U.S. patent application Ser. No. 566,925, entitled "Internal Bus Architecture for a Primitive Instruction Set Machine," by J. Cocke, D. Fisk, L. Pereira and G. Radin.

The two following PCT applications filed December 30, 1982 are related to the present application in that they also have particular memory hierarchy including a split cache and to an address translation mechanism respectively.

(1) PCT Serial No. U.S. 82/01830, entitled "Hierarchical Memory System Including Separate Cache Memories for Storing Data and Instructions," by F. P. Carrubba, J. Cocke, N. H. Kreitzer and G. Radin.

(2) PCT Serial No. U.S. 82/01829, entitled "Virtual Memory Address Translation Mechanism with Controlled Data Persistence," by A. Chang, J. Cocke, M. F. Mergen and G. Radin.

PRIOR ART

An article entitled "The 801 Minicomputer," by George Radin, published in ACM SIGPLAN NOTICES, Vol. 17, No. 4, April 1982, pages 39–47, includes a general description of an experimental computer whose operational characteristics depend to a large extent on a very fast memory subsystem having separate caches for instruction and data and also having a primitive very basic instruction set providing most commonly used machine operations most of which should be executable in a single machine cycle. The present one cycle executable trap instruction has particular utility in such a machine architecture.

A similar CPU architecture has been described by Patterson and Sequin in "RISC 1: a Reduced Instruction Set VLSI Computer," in the IEEE 8th Annual Symposium on Architecture Conference Proceedings of May 12–14, 1981, at pages 443–449, and in expanded form in IEEE Computer, September 1982 at pages 8–20. The RISC 1: system is stated to be a reduced instruction set machine. No reference is made to any special trap instruction and hardware for implementing same in this article.

U.S. Pat. No. 3,999,052 describes a upper bounds checking system which reduces the time to perform the storage boundary check.

U.S. Pat. No. 3,573,855 discloses a memory protection system with upper and lower boundary checking logic. The claims include ID code bits and decoding logic.

Neither of the above patents disclose nor suggest a one machine cycle executable instruction and hardware for, in effect, performing such range checking in a single machine cycle.

SUMMARY AND OBJECTS OF THE INVENTION

It is a primary object of the present invention to provide a 'trap' instruction and mechanism for performing same which is executable within one machine cycle of a primitive reduced instruction set machine system, as compared to several machine cycles of a compare and branch condition sequence on an IBM System 370 machine.

It is a further object to provide such a mechanism wherein the hardware added is minimal.

It is another object to provide such a mechanism which uses existing CPU circuitry for compare instruction data flow, branch instruction testing logic, and interrupt generation logic.

It is another object to provide such a mechanism wherein run time checking will result in little performance degradation.

It is a further object of the invention operative, together with an intelligent compiler, to provide software extent checking at compile time, disk edit time, program fetch time and at run time if desired.

It is a still further object of the invention to provide such a one cycle trap instruction which provides a one cycle method for checking a condition and continuing execution of the instruction stream in parallel.

It is another object of the invention to provide such an instruction which checks for storage access violations in a single machine cycle.

It is another object of the invention to provide such an instruction which does not set any condition codes nor destroy the contents of any register.

The foregoing and other objects, features and advantages of the invention will become apparent from the following more particular description of the preferred embodiments of the invention as illustrated in the accompanying drawings.

The objects of the present invention are accomplished in general by a mechanism in the CPU whereby a trap instruction is begun in a first machine cycle wherein the op code is decoded, and the specified operands compared. The remainder of the trap instruction is completed in parallel with the beginning of the execution of the next instruction in the instruction stream. The essential feature of the invention is that the data flow path, timing and logic circuitry must be capable of initiating a 'trap' interrupt before the 'next' instruction is committed.

BRIEF DESCRIPTION OF THE DRAWINGS

FIG. 2 comprises an organizational drawing for FIGS. 2A and 2B.

FIGS. 2A and 2B comprise a functional block diagram and data flow diagram of a CPU designed to utilize the trap instructions and mechanism of the present invention.

FIGS. 4.1 and 4.2 are timing diagrams illustrative of the events which occur during the execution of a conventional "compare and branch" instructions and the 'trap' instruction of the present invention.

DESCRIPTION OF THE PREFERRED EMBODIMENT

Figure 1:
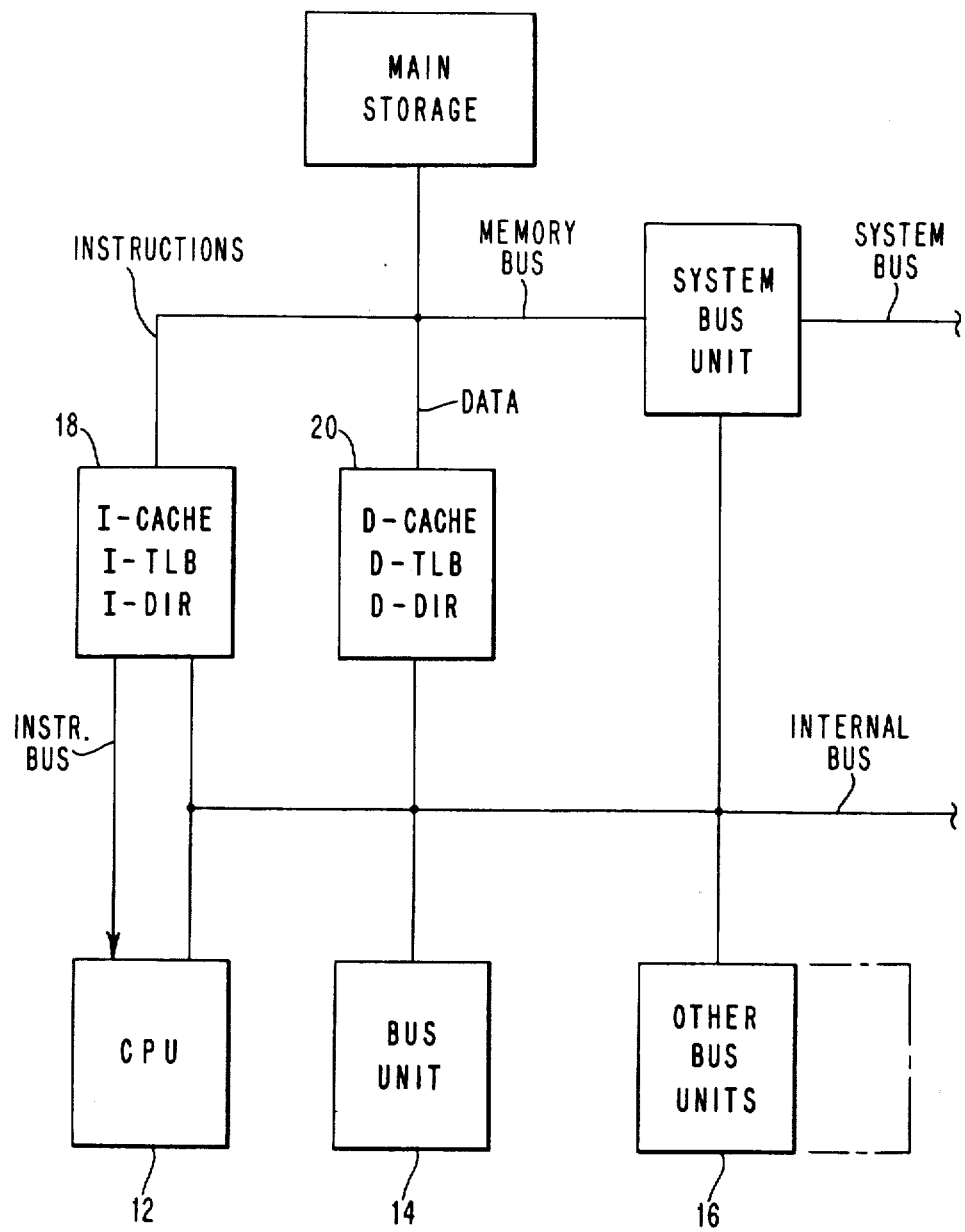
FIG. 1 comprises a high level block diagram of the primary system components including the CPU, main storage, the D and I caches, the system I/O bus and the internal bus with a number of bus units attached thereto.

General Description of Host PRISM System Architecture

The heart of the previously referenced PRISM system is its Central Processing Unit (CPU). In fact, most of the other aspects of the system are designed to make available to the user the fundamental power of this engine. In addition to its CPU. The overall system consists of the main storage, cache facilities, relocate facilities, and system I/O (See FIG. 1). The cache is split into two parts, one for data, the other for instructions. (See previously referenced PCT Application No. U.S. 82/01830.)

As stated previously the CPU architecture is a radically simpler alternative to the complex prior art mainframes. The major distinguishing characteristics of the present PRISM system architecture is that its instructions are designed to execute in a single machine cycle by hardware.

That is, every primitive instruction takes exactly one machine cycle, except for accessing storage, which will usually be overlapped. The term primitive as used herein, relates to time rather than simplicity of concept. Thus primitive is closely associated with the concept of a single machine cycle. That is to say the primitive instructions are those which are effectively executable within a single machine cycle although the actual functions may be relatively complex in terms of what actually takes place within the system hardware.

Going further, the term single machine cycle may be defined in a number of ways. Stated in one way a single machines cycle is the period of the basic system clock which continually repeats itself during the operation of the system and during which time basic system operations are performed. Stated in a somewhat different way a single machine cycle is the period of time necessary for the system to use the complete set of system clock pulses once, i.e., all of the pulses included in the basic clock period. Thus within a single machine cycle all of the CPU data flow facility may be used once.

Complex functions are implemented in the system in "micro-code" just as they are in conventional CPUs, except that in the PRISM system this micro-code is just code; that is, the functions are implemented by software subroutines running on the primitive instruction set.

Using the concept of executing complex operations with code resistant in cache, the number of cycles required to do a particular job is at worst no more than on a conventional (low-to-moderately priced) CPU in which the complex instructions have been microprogrammed. But by carefully defining the primitive instructions to be an excellent target machine for the compiler, it is found that far fewer cycles are actually required on the CPU.

The one machine cycle executable 'trap' instruction of the present invention is exemplary of a newly conceived primitive instruction which is intended to save significant amounts of time in memory accessing operations wherein 'range checking'can be accomplished simply (one machine cycle) and effectively in the vast majority of instances. It should be understood that when a violation occurs, a more lengthy subroutine must be entered. However, this will rarely occur. Further advantages and uses of the trap instruction will be set forth subsequently.

Thus the PRISM system architecture and its instruction set are the achievement of the following three pervasive strategies. First a fast one-cycle per instruction CPU is defined with an instruction set which was a good target for compilation. Next, an approach to the storage hierarchy, I/O, relocate, and software were developed to overlap these activities with CPU execution, so that it waits minimally.

Finally, an optimizing compiler is developed which produces code which is safe and efficient enough so that the system can be built to assume that all programs have been compiled by this compiler.

In addition to being executable in one machine cycle, the other overriding theme of the instructions is their regularity. This has helped to make the hardware implementation easier. For instance:

All operands must be aligned on boundaries consistent with their size (i.e., halfwords on halfword boundaries, words on word boundaries). All instructions are fullwords on fullword boundaries.

Register name fields are made five bits long so that 32 register implementations are possible when the technology makes this choice desirable. (This aspect of PRISM system archietecture makes it feasible to use the system to emulate other architectures which have 16 GPRs, since 16 PRISM registers are still available for emulator use. A major problem with using the primitive subset of S/370 instructions for emulating complex instructions is the just described register name field restriction.)

Four byte instructions also allow the target register of every instruction to be named explicitly so that the input operands need not be destroyed. This is generally called a "three address" format. The PRISM system is a true 32-bit architecture, not a 16 bit architecture with extended registers. Addresses are 32-bits long; arithmetic is 32 bit two's complement; logical and shift instructions deal with 32-bit words (and can shift distances up to 31).

The major components of the PRISM CPU shown in the data flow diagram of FIG. 2 are a two-input ALU, a five-port (3-output, 2-input) general purpose register file (32 registers of 32-bits each), and condition logic and the condition register. The condition register (CR) is a 32-bit register which reflects the effect of certain operations, and provides a mechanism for testing (and branching).

Tables 1(a) and 1(b) comprise a complete listing of the 32-bits in the condition register as well as their function in the overall CPU architecture. Very few of the condition register bits enter into the operation of the present invention relating to the implementation of the present "one cycle executed trap instruction" only the setting and use of those bits will be described subsequently. The great bulk of the other condition register bits, their setting and use is believed to be quite straightforward and well-known to those skilled in the art.

TABLE 1(a)

| Condition Register Bit Designation | | |
|---|---|---|
| Bit | Name | Description |
| 0 | SO | Summary Overflow |
| 1 | OV | Overflow |
| 2 | LT | Compares Less Than, Negative Value |
| 3 | GT | Compares Greater Than, Positive Value |
| 4 | EQ | Compares Equal, Zero Value |
| 5 | LL | Logical Less Than |
| 6 | LG | Logical Greater Than |
| 7 | CA | Carry from bit 0 |
| 8 | C4 | Carry from bit 4 |
| 9 | C8 | Carry from bit 8 |
| 10 | C12 | Carry from bit 12 |
| 11 | C16 | Carry from bit 16 |
| 12 | C20 | Carry from bit 20 |
| 13 | C24 | Carry from bit 24 |
| 14 | C28 | Carry from bit 28 |
| 15 | CD | Carry from any 4-bit nibble |
| 16 | PZ | Permanent Zero |
| 17-25 | | (Reserved for future use) |
| 26 | EC0 | External Condition 0 |
| 27 | EC1 | External Condition 1 |
| 28 | EC2 | External Condition 2 |
| 29 | EC3 | External Condition 3 |
| 30 | BB | Bus Busy (for Conditional Bus Operations) |
| 31 | HO | Halfword Overflow (overflow from lower 16 bits) |

TABLE 1(b)

Functional Description of the Bits in the Condition Register (Note: Bits not set by an instruction retain their old values.)

Bit 0 (SO) is the Summary-Overflow bit. Whenever an instruction sets the overflow bit to indicate overflow, it sets the SO bit to one, otherwise the SO bit is unchanged. (The use of overflow as a special indicator in divide step does not affect Summary-Overflow.)

Bit 1 (OV), the Overflow bit, is set to indicate that an overflow has occurred during an instruction operation. It is set to one on add and subtract instructions if the carry out of bit zero is not equal to the carry out of bit one. Otherwise it is set to zero. It also functions as a special purpose indicator for the Divide Step instructions. It is not altered by the compare instructions.

Bits 2-6 are set to indicate the computation result of the executed instruction.

Bit 5 (LL), the Logical-Less-Than bit, and
Bit 6 (LG), the Logical Greater-Than bit, are set considering the two operands as 32-bit unsigned integers. Bit 2 (LT), the Less-Than bit, Bit 3 (GT), the Greater-Than bit, and Bit 4 (EQ), the Equal bit, are set considering the two operands as 32-bit signed integers in two's complement representation.

Bits 2-6 are also set by the compare and logical instructions.

Bit 7 (CA), the Carry bit, is set to indicate a carry from bit 0 of the computed result. On add and subtract instructions it is set to one if the operation generates a carry out of bit 0. If there is no carry out it is set to zero. It also functions as a special-purpose indicator for the Divide and Multiply instructions. It is not altered by the compare instructions.

Bits 7-14 indicate carry outs of each nibble in the ALU. Bit 8 (C4) is set to 1 if there is a carry out of bit 4. It is set to 0 if there is no carry out.

Bits 9-14 (C8-C28) are set similarly. These carries are provided to assist in performing decimal arithmetic.

Bit 15 (CD) is set to 1 if there is a carry out of any 4-bit nibble. Otherwise it is set to 0.

Programming note: CD can be used to verify that all of the decimal digits in a number are valid.

Bit 16 (PZ) is the permanent-zero bit. It is always zero and it cannot be reset to one. Its presence provides for an unconditional branch by use of the Branch False instruction, where the permanent zero bit is specified.

Bits 17-25 are reserved bits. They are implemented but are not modified by any conditions in the PRISM.

These bits of the condition register can be arbitrarily set by the Load Condition Register instruction. Subsequent fetches or tests will reflect those values.

Bits 26-29 (EC0 through EC3), External Condition Bits. These bits are set to the values of the corresponding CPU inputs EXT-COND-0 through EXT-COND-3 when the EXT-COND-VALID is active.

Bit 30 (BB), the Bus Busy bit, is set to 1 if a CBO, CBOU, or CBOI instruction could not be executed by a bus unit because it was busy, otherwise it is set to zero for those instructions. It is unchanged by other instructions.

Bit 31 (HO), the Half Word Overflow bit, is set to indicate that an overflow on the lower 16 bits has occurred during an instruction operation. It is set to one on add and subtract instructions if the carry out of bit 16 is not equal to the carry out of bit 15. Otherwise it is set to zero. It is not altered by the compare instruction.

The MQ register is a 32-bit register whose primary use is to provide a register extension to accommodate the product for the Multiply Step instruction and the dividend for the Divide Step instruction. It is also used as an operand storage location for long shift and rotate and store instructions.

The Instruction Register is a 32-bit register which is quite conventional in nature. The following instruction formats illustrated in Table 2(a) are utilized in the system.

The instruction address register is conventional in nature and points to the location in memory where a desired instruction is resident.

The Mask and Rotate (M&R) Logic block contains the logic circuitry necessary to perform the M&R instructions specifically disclosed and described in previously referenced concurrently filed Application Serial No. 509,836.

The Condition Logic and Condition Register is conventional to the extent that the setting of the various bits therein is required as the result of specified conditions which do or do not occur as a consequence of various system operations. Details of the particular condition register architecture utilized in the herein disclosed preferred embodiment of a PRISM system architecture are set forth and described in previously referenced, concurrently filed, Application Ser. No. 509,744.

Both the Data and Instruction Cache Interfaces provide paths for providing instruction addresses and data between the two caches and the CPU. Details of the operation of these caches are set forth in previously referenced copending PCT Application Ser. No. 82/01830.

All instructions are four bytes long and are located on fullword boundaries.

Bits 0–5 always specify the op code. For some instructions, bits 21–31 specify extended op codes.

The remaining bits contain one or more of the following fields, in the indicated bit positions:

TABLE 2(a)

| Instruction Formats |
|---|
| D-form, UL-form |
| 0    6   11  16          31 |
| OPCD RT  RA  D |
| RS |
| BI |
| |
| M-form |
| 0    6   11  16  21      31 |
| OPCD RT  RA  RB  MASK |
| SH |
| |
| X-form |
| 0    6   11  16  21      31 |
| OPCD RT  RA  RB  EO |
| RS       SH |
| BI |

Table 2(b) contains a definition of the various instruction fields used in the instruction formats illustrated in Table 2(a).

TABLE 2(b)

OPCD (0–5)
  The basic op code field of the instruction.
RT (6–10)
  Name of the register used as the "target" to receive the result of an instruction.
RS (6–10)
  Name of the register used as a source for an instruction.
RA (11–15)
  Name of the register used as the first operand or as the target for rotate instructions.
RB (16–20)
  Name of the register used as the second operand.
BI (6–10)
  Immediate field specifying a register bit or a trap mask.
SH (16–20)
  Immediate field specifying a shift amount.
D (16–31)
  Immediate field specifying a 16-bit signed integer in two's complement notation. When this field is used with other fields that are 32-bits in length the D field is always sign extended.
MASK (21–31)
  Immediate field specifying a 32-bit string, consisting either of a substring of ones surrounded by zeros or a substring of zeros surrounded by ones. The encoding is as follows:
  Bit 21
    0 = ones surrounded by zeros
    1 = zeros surrounded by ones
  Bits 22–26
    Index to leftmost bit of substring
  Bits 27–31
    Index to rightmost bit of substring
  A mask field of '10000011111' generates an all zero mask. A mask field of '00000011111' generates an all one mask. The result of specifying an invalid mask (i.e. first index greater than last index) is undefined.
EO (21–31)
  The extended op code.

The four previously referenced copending applications filed concurrently with the present application all relate to specific hardware enhancements which render such a PRISM system more efficient.

Description of the One Machine Cycle Executable Trap Instruction Mechanism

The implementation of the present one cycle trap instruction, together with an intelligent compiler, eliminates the need for the hardware implementation of a storage validity check. The intelligent compiler is to do all extent checking except the run time check, which will be done by this special instruction and its associated hardware.

The overall approach to memory protection utilized in the PRISM system set forth in the Radin article is strongly based upon an intelligent compiler intermediary between users and the hardware. Conventional systems expect application programmers, and certainly subsystem programmers, to use assembly language or other languages in which it is possible to subvert the system (either deliberately or accidently). Thus hardware facilities are required to properly isolate these users. The most popular examples of these facilities conventionally used in the art are storage protect keys, multiple virtual address spaces, and supervisor state. These facilities are often costly and sometimes degrade performance. But what is more important is that they are generally inadequate. Since even 16 different keys are insufficient to assign uniquely, for instance, different users are sometimes given the same key or the system limits the number of active users. Also, because the key disciplines are only two level, many subsystems are forced to run in key zero.

If, however, users are constrained to a properly defined source language, and their programs are processed by an intelligent compiler and run on an operating system which understands the addressing strategies of the compiler, it is possible to provide far better protection at much less cost. The above reduced instruction set system, therefore, is based upon the assumption that certain critical components of the compiler are correct, and that all programs executing on the system (except for a supervisor core) have been compiled by this compiler. The compiler will guarantee:

that all references to data (scalars, arrays, structures, areas) really do point to that data, and that the extent of the references are included in the extent of the data,
  that a reference to dynamically allocated-and-freed data is made only between an allocation and a free,
  that all branches are to labels, and all calls are to proper entry points in procedures,
  that all arguments to a procedure match their corresponding parameters, so that the protection persists across calls.

This checking is often done at compile time, link edit time, or program fetch time, but when necessary, a new type of instructions called trap instructions are introduced into the object code to check at run time. The resulting increase in pathlength due to this run time checking is generally less than 10% because this code is optimized along with the rest of the program. Comparing this to the performance degradation in the PL/I language when subscript range checking is enabled, or when the Checkout compiler is run shows the power of these optimization algorithms.

Uses and Advantages of the Present Trap Instruction

The trap instruction of the present invention tests an inequality and permits execution to continue sequentially if the inequality is not satisfied. If the inequality is satisfied, an interrupt occurs, after which appropriate remedial action can be taken. The trap instruction is primitive only in the sense that it can be realized in the number of delays allocated to one CPU cycle.

Execution of the trap instruction does not alter the CPU's state: the condition register and all of the computational registers remain unchanged. Thus use of the trap instruction does not pose any problem to a compiler about partial destruction of the state of the CPU. To get a similar effect on a machine without the trap instruction, such as the IBM System/370 a compare and a conditional branch instruction must be used. This has several dis-advantages: Two instructions rather that one are needed. The conditional branch may cause delays in a high performance architecture even when the branch will fail (the expected case). The code takes more space and time. The condition register is altered, making code generation more difficult.

The inequalities that the trap instructions test are designed by the software to test whether reference to a data aggregate is valid. These inqualities can be designed to give a much finer level of control than can be obtained by using storage keys. In a computer such as the IBM 370, different areas of storage can be assigned one of 16 keys (in blocks of 4096 bytes), and only references to blocks containing one of the 16 possible storage keys are considered to be valid. Thus, use of the storage key hardware gives only a coarse granularity. Using several keys within a program requires expensive privileged instructions to respecify the one key which the CPU recognizes as valid.

With the 801 Trap instruction, reference to a data aggregate can be preceded by trap instructions which can test whether the aggregate exists (in the case of dynamically allocated objects), whether the reference is within the storage allocated to the aggregate, or whether each subscript in an array reference is within the bounds declared for each subscript position. The last case gives much stronger checking than merely testing whether the reference is within the storage allocated to the array.

Normally, two instructions are required to test the validity of a subscript: one against the lower bound, and one against the upper bound. But in the case of a lower bound of zero, and an upper bound known to be less than $2^{31}$, one trap instruction can suffice, because a logical compare of the subscript against the upper bound would treat all negative subscripts as being greater or equal to $2^{31}$.

The present 'trap' instruction is viewed by the Optimizing Compiler as not introducing program flow, since under normal circumstances, the 'trap' is not expected to cause an interrupt. The 'trap' instructions can be subjected to all the conventional optimizations to reduce the cost of providing checking. This is in contrast to other means of software validity checking, such as PL/1's subscript-range and stringrange checking, which introduce program flow and subsequently suppress most optimiza-tions, not only of range checking, but of all computations. The cost of validity checking with the 'trap' instruction is usually below 10 percent.

Ideas for optimizing range checking code using the 'trap' instruction is presented in: V. Markstein, J. Cocke, P. Markstein, "Optimization of Range Checking", Proc. of SIGPLAN Symposium on Compiler Construction, June, 1982, pp 114–119.

Typical Format of the Present Set of Trap Instructions

In a 'trap' instruction, operand two is compared with operand three. This comparison results in conditions corresponding to condition code bits 2-6 to be set to 0 except as follows:

$$LT = 1$$

if operand one is less than operand two (less than)

$$GT = 1$$

if operand one is greater than operand two (greater than)

$$EQ = 1$$

if operand one is equal to operand two (simple equality)

$$LL = 1$$

if operand one is less than operand two, both treated as 32-bit unsigned integers (logical less than)

$$LG = 1$$

if operand one is greater than operand two, both treated as 32-bit unsigned integers (logical greater than).

Five of these conditions are AND'ed with BI. If the result is not 0, a trap interrupt occurs. These conditions are:

BI bit AND'ed with condition bit 6 with LT condition
bit 7 with GT condition
bit 8 with EQ condition
bit 9 with LL condition
bit 10 with LG condition

| Trap Immediate Instructions |
|---|
| TI    BI,RA,D |
| 0    6    11    16    31 |
| 46    BI    RA    D |

The contents of register RA (operand two) are compared with the contents of the D field (operand three). The trap is taken if a non-zero results from AND'ing the BI bits and the conditions resulting from the compare.

Condition Codes:
Set: None

| Trap Instructions |
| --- |

| T | BI,RA,RB | | | |
| --- | --- | --- | --- | --- |
| 0 | 6 | 11 | 16 | 21 | 31 |
| 63 | BI | RA | RB | 46 |

The contents of register RA (operand two) are compared with the contents of RB (operand three). The trap is taken if a non-zero results from AND'ing the BI bits and the conditions resulting from the compare.

Condition Codes:
Set: None

Figure 3:
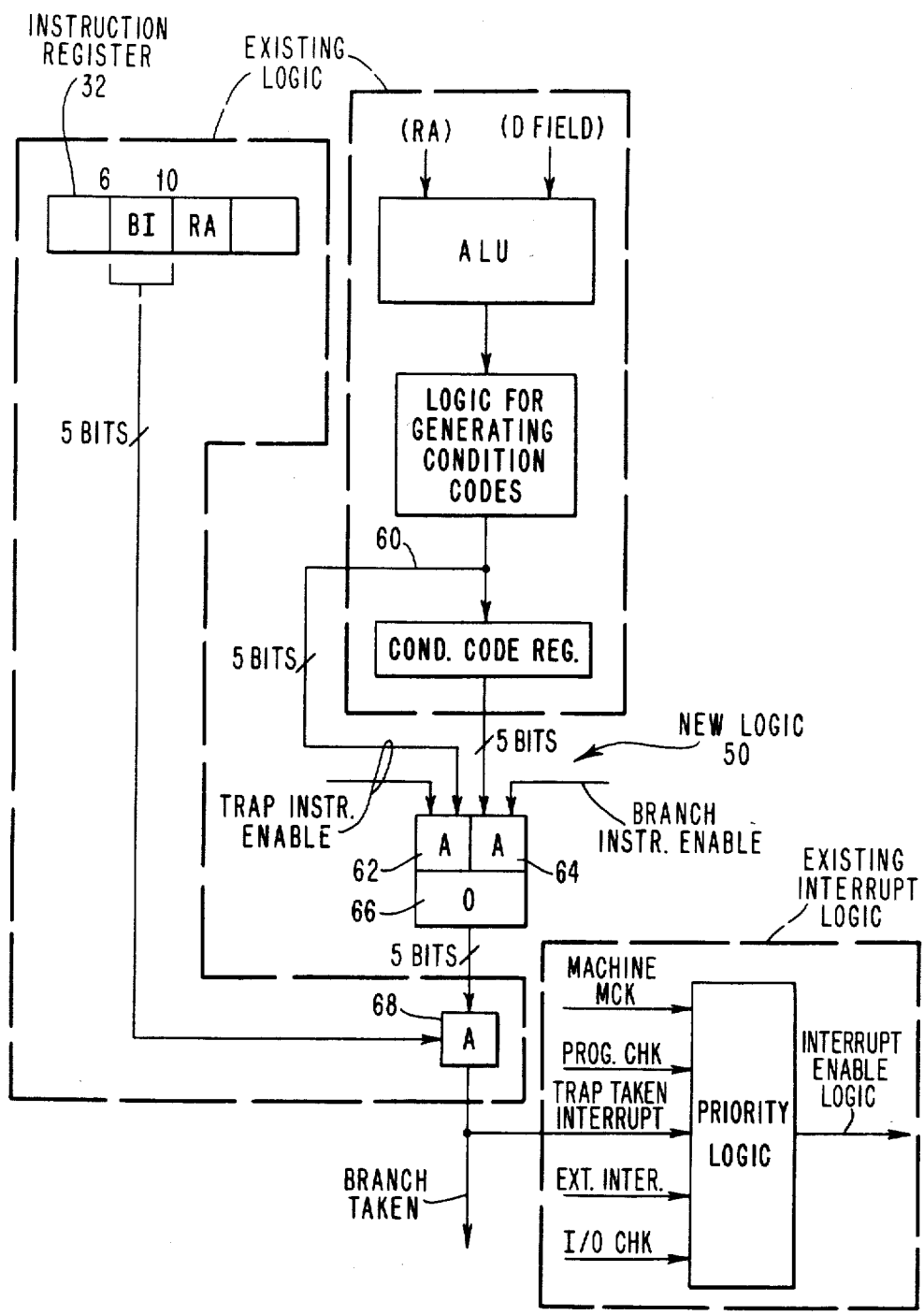
FIG. 3 comprises a portion of the data flow chart of FIG. 2 showing additional details of the hardware necessary to implement the one cycle executable trap instruction of the present invention.

Without loss of generality, the "Trap Immediate" Instruction is used to illustrate data flow in the system as shown in FIG. 3.

This dataflow drawing indicates the existing system and the added circuits for the trap instruction implementation.

The design is optimized for the "trap not taken" case so that only one machine cycle is used. It is understood that this test virtually never results in a trap interrupt and that accordingly when one does occur only the interrupt condition may take a number of machine cycles. In these exceptional cases, the first machine cycle after the trap instruction is to inhibit the execution of the next instruction and enter the interrupt mechanism. The abortion or inhibition of an execution of an instruction in the early part of the machine cycle is easily done because for every instruction, only the op decode and GPR reads are performed in the early part of a machine cycle, and both actions are non-destructive.

Description of the Present Hardware Mechanism for Executing the Trap Instruction Since the present invention resides primarily in the novel structural combination and the method of operation of well-known computer circuits and devices, and not in the specific detailed structure thereof, the structure, control, and arrangement of these well-known circuits and devices are illustrated in the drawings by use of readily understandable block representations and schematic diagrams, which show only the specific details pertinent to the present invention. This is done in order not to obscure the disclosure with structural details which will be readily apparent to those skilled in the art in view of the description herein. Also, various portions of these systems have been appropriately consolidated and simplified to stress those portions pertinent to the present invention.

Referring to FIG. 1 an overall organizational block diagram of a typical PRISM system architecture is shown. The CPU 12 is depicted as a separate unit, however, it will be understood that the internal bus 10 is actually a composite member of the basic CPU architecture. Specific units shown directly attached to the internal bus 10 are the floating point unit 14 and a block designated other bus units 16 which, as will be readily understood, may comprise a plurality of different units separately attached to the bus 10. The instruction cache 18 and data cache 20 are also illustrated as connected to the internal bus and thus operable under various internal bus operation instruction formats (described previously). A system bus unit 22 is also shown connected to the internal bus which would primarily perform the function of system I/0 operations to and from main storage as will be understood by those skilled in the art. No specific instructions for controlling the system bus unit are described herein, however, operation instructions to control such a system bus unit are well known and would be obvious to those skilled in the art.

Figure 2A:
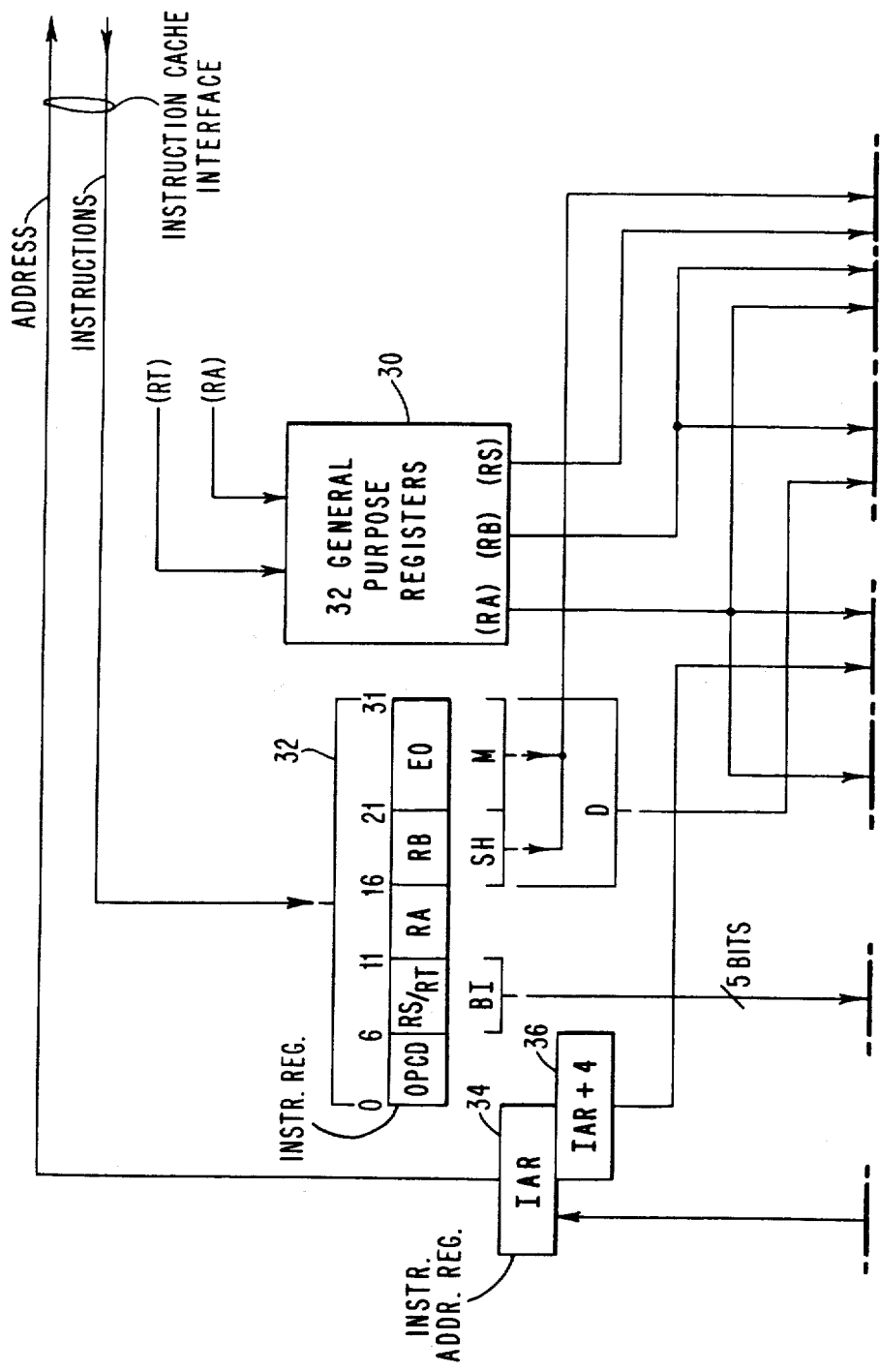

FIGS. 2A and 2B form a composite functional block and data flow diagram for the PRISM CPU. These two figures are organized as shown in the organi-zational diagram of FIG. 2.

The data flow within the basic PRISM organization is clearly shown in FIGS. 2A and 2B.

The basic CPU includes a five port general purpose registers block 30 containing thirty two individual registers. The two inputs to the register block RT and RA as well as the three outputs RA, RB, RS indicate the particular instruction designated operands set forth in the previous description of the instruction formats. As will be apparent to those skilled in the art, the (address of the) particular general purpose register in which the various operands are to be stored or from which they are to be fetched would be specified in the various fields of the instruction register.

The organization of the instruction register 32 is straightforward. It should be noted that this is a 32-bit register with the various delineated fields within the register clearly shown in the drawing (designated bits) as well as the mnemonic representations of the various fields as used in the previously described instruction formats. The designated BI, SH and M beneath the primary instruction register box 32 indicates the mnemonic representation given to these fields in certain of the instructions. However it should be understood that these are shown outside of the instruction box for convenience of reference only.

The instruction address register (IAR) 34 is also conventional in nature and would be initially loaded at the beginning of a program and suitably incremented or reloaded by the program subsequently as required. Block 36 labeled (IAR+4) contains the next instruction address.

The data flow from the instruction register 32 and the general purpose registers 30 is clearly shown in the figures thus, for conventional arithmetic operations the two multiplexers 38 and 40 may receive as input operands various fields from the instruction address register 34, instruction register 32 and the specified operands RA, RB from the general purpose registers 30. Thus the ALU 42 performs two operand operations and places the result in output buffer register 44. As will be apparent the output from the ALU may also go directly to the instruction address register 34, the condition logic and condition register block 50, the branch and trap testing logic 52 and the address gate 54 which supplies addresses to the system memory when required.

The output of the buffer register 44 is able to return data to the general purpose registers 30 via the multiplexers 46 and 48 depending upon whether the field RA or RT is specified by the instruction.

The mask and rotate logic block 56 performs a one-machine cycle executable mask and rotate operation set forth in more detail in copending application Ser. No. 509,836 referenced previously and does not enter directly into the present 'trap' instruction. Similarily the details of the condition logic and condition register block 50 are the subject matter of previously referenced copending application Ser. No. 509,744. The present mecha-nism utilizes the generated condition codes; however, it does not cause the condition code register to be set.

Block 52 entitled branch and trap testing comprises the circuitry necessary to perform the trap testing function and produce a trap interrupt if necessary and also to perform "branch-on-bit" testing which latter is the subject matter of previously referenced copending application Ser. No. 509,734.

Gates 56 and 58 serve to gate data to and from the system memory as required for certain specified operations. These two gates and buses comprise the Data Cache Interface.

The register MQ shown in the mask and rotate logic block 56 is an extension register for storing the overflow contents from a number of arithmetic operations such as multiply and divide. It is functionally located in this block for purposes of the present embodiment as it is utilized during the certain mask and rotate instructions which are set forth and claimed in copending application Ser. No. 509,836.

Referring now to FIG. 3 it should first be noted that the various sections of the underlying CPU surrounded by dotted lines are essentially conventional in nature and form a portion of the basic CPU assuming that the CPU did not have the present capability, of course, to implement one-cycle executable 'trap' instructions.

The block in the lower left hand corner of the figure entitled "Existing Interrupt Logic" is intended to be typical of any small to medium size CPU wherein provision is made for a number of possible system interrupts. Predetermined priority logic circuitry determines which interrupt will be serviced at any given time or in fact whether a given interrupt is permissible at a given point in time. It is noted in passing, that the "trap taken" interrupt is one of the possible machine-interrupts which could cause the processing of the current instruction stream to terminate or be suspended until the interrupt condition is corrected. However, the particular interrupt handling procedures would be conventional and will not be treated further as they are not relevant to the present invention.

The specific new logic added by the present invention comprises the block 50 which comprises two gates 62 and 64 and OR gate 66. Specifically, gates 62 and 66 provide means for very rapidly passing the results of the compare operation effected by the trap instruction directly from the condition code logic generation circuitry to gate 68 where it is compared with the BI (Branch Immediate) field of the instruction register. Thus, if a one exists in a particular bit position, from the output from the condition code logic and also in the same bit position in the BI field an output will be produced from OR gate 66 which will indicate that a trap interrupt must be taken.

It will be noted that a direct line 60 is provided for transmitting the output from the condition code logic generation circuitry directly into AND qate 62 so that there is no need to wait for the setting of the condition code register which is not necessary in the event that a trap interrupt either is or is not taken.

FIGS. 4.1 and 4.2 are timing charts which clearly illustrate the invention whereby in the majority of instances an effective 'one-machine cycle' execution time trap instruction is realized.

FIG. 4.1 illustrates a conventional 'compare' instruction followed by a 'branch' instruction followed by any 'next' instruction in the instruction stream. The instruction stream example of FIG. 4.1 is chosen since, in essence, the trap instruction requires first a compare operation and then a test for an interrupt condition which is the functional equivalent of a branch instruction. The way this is implemented in the present invention allows the trap test to effectively be performed in one-machine cycle assuming that it is not necessary to take the trap interrupt. Thus referring to FIG. 4.1 during the execution of the compare instruction it will be noted that a timing pulse is provided for the ALU to compare some specified set of two operands.

Then proceeding to the next cycle where the branch instruction test is made appropriate condition codes are generated and set in accordance with the comparison made during the compare instruction cycle. This is similarly shown by the upper timing pulse under the branch instruction cycle. Next the BI field is tested against the condition codes to determine if the branch condition has or has not been met. Finally, in the lower cycle, logic circuitry is set in the instruction controls to cause the branch to be taken or not to be taken. The next instruction begins after the branch taken determination is made. As will be apparent to those skilled in the art the next instruction could then be the first instruction of the branch or the next sequential instruction after the branch instruction. Thus, it will be seen that in the conventional compare and branch instruction sequence illustrated in FIG. 4.1 at least two machine cycles are necessary before the final branch determination is made.

In contrast to this rather conventional operating sequence the present trap instruction operates as illustrated in FIG. 4.2. This will be apparent from the subsequent description. The machine operations necessary to effect the trap instruction are performed during the trap instruction cycle and in that portion of the next instruction cycle prior to the time the CPU has "committed" itself to performing the next instruction. What this means, for example, is that the next instruction is decoded and two operands are gated into the ALU. Whatever operation is specified is performed and the output from the ALU is available to the system. However, during approximately the first ⅛ to ⅜ of the next instruction cycle, the instruction address register, the instruction register and the content of the GPRs are unchanged. Also, the various gates for gating the results of the ALU operation outside of the ALU output bus are unchanged. The result of this is that if the operation is aborted at this time, the current 'next' instruction will still be in the instruction register and subsequent to any type of system interrupt this instruction would be in the next one seen by the CPU when it returns to processing the instruction stream. Stated differently it is the time after which certain destructive (of data or address) operations occur, e.g., an IAR update or a memory operation must not be allowed to begin.

Utilizing this concept the present invention causes the condition code from the trap instruction to be generated as illustrated in the first portion of the 'next' instruction cycle in FIG. 4.2 and similarly, the testing of the BI field against the generated condition code is performed and a 'trap taken' determination made for said "commit time." Thus, the latter half of the 'trap' instruction is in effect performed in parallel with the first half of the 'next' instruction.

For illustrative purposes, the "commit time" is indicated in FIG. 4.2 by the dotted vertical line shown slightly to the right of the 'trap taken' determination. Thus if the trap is taken, a machine interrupt will be generated and the instruction stream execution will in effect stop at the beginning of the illustrated next instruction cycle.

Since such trap instructions require a trap interrupt substantially less than 10% of the time, the next instruction is obviously seldom aborted and the trap instruction and the test required thereby normally only require a single effective machine cycle for their execution. The results of using such a trap instruction accordingly provide a significant improvement in system throughput.

It will be seen from the preceeding detailed description of the trap instruction and the description of the hardware within the CPU which implements the same, the one-machine cycle execution time is achieved in only those circumstances where a 'trap interrupt' is not necessary. This in turn is accomplished by paralleling the final operations of the trap instruction with the beginning operations within the CPU of the 'next' instruction. This speed up or parallelism is accomplished in effect through bypassing the setting of the condition code register and providing several logic gates which check for the particular trap condition specified in the BI field of the trap instruction itself.

While the invention has been set forth and described with respect to the herein disclosed preferred embodiment thereof, it will be readily appreciated by those skilled in the art, that many changes may be made in the form and detail of both the instructions and in certain hardware details which might alter certain internal operating sequences without departing from the spirit and scope of the present invention as set forth in the appended claims.

Having thus described our invention, what we claim as new, and desire to secure by Letters Patent is:

1. In a digital electronic computing system having a single machine cycle executable instruction set including a memory hierarchy comprising a main memory and a high-speed cache, a Central Processing Unit (CPU) and a bus network interconnecting same, said CPU including an arithmetic and logic unit (ALU) for performing mathematical and logical operations on data supplied thereto, an instruction unit operable in cooperation with a plurality of simultaneously accessible general purpose registers and said ALU for processing primitive instructions to be performed by said system, and condition code generating means for generating a plurality of specified condition bits in accordance with the output of the ALU and the instruction unit including at least less than, greater than, and equal to indicator bits as a result of a 'compare' operation in the ALU on two specified operands, the improvement which comprises:
   a mechanism for performing a one cycle trap instruction in said CPU including means for directing the ALU to perform a compare operation between two operands specified by said instruction,
   means for directly testing the output of said condition code generation means to determine if a specified one of said comparison bits has been set,
   means operable upon an affirmative indica-tion by said last named means to cause a 'trap' interrupt to be taken.

2. A mechanism for performing one cycle executable 'trap' instructions as set forth in claim 1 wherein said means for directly testing includes means for preventing the setting of the condition register without regard to the results of the test.

3. A mechanism for performing one cycle executable 'trap' instructions as set forth in claim 2 including means operable to begin executing the next instruction in the instruction sequence after the 'trap' instruction further including,
   means operable for generating and testing the condition codes of the 'trap' instruction in parallel with non-data destructive operations of said 'next' instruction.

4. A mechanism for performing one cycle executable 'trap' instructions as set forth in claim 3 including means for causing a trap interrupt to be taken, if necessary, prior to the 'commit' time of said 'next' instruction.

5. A mechanism for performing one cycle executable 'trap' instructions as set forth in claim 4 including timing means actuable by said 'trap' instruction to cause the comparison operands to be transferred to the ALU and the required comparison to be performed during a first machine cycle and for causing the condition code bits to be generated and tested at the beginning of the immediately succeeding machine cycle.

6. In a digital electronic computing unit (CPU) for executing said instructions wherein said Central Processing Unit includes at least an instruction unit for accessing and decoding instructions and an arithmetic logic unit (ALU) for performing the operation specified by said instructions, said CPU also including a condition register which contains bits set in accordance with the results of specified ALU operations, the improvement which comprises:
   a method for performing a one machine cycle executable trap instruction including specifying two operands whose magnitudes are to be compared, specifying the result of said compare operation which will cause a 'trap' interrupt to be taken,
   accessing the system general purpose registers and performing the compare operation during the machine cycle in which the trap instruction was initiated, beginning the execution of the 'next' instruction at the beginning of the 'next' machine cycle,
   generating the actual condition code bits and testing said bits against the trap condition specified in said trap instruction during the first portion of said 'next' machine cycle in parallel with the beginning of the execution of said 'next' instruction, and
   causing a trap interrupt to be taken prior to the "commit" time for the 'next' in-struction in said 'next' machine cycle.

7. A method for performing a trap operation as set forth in claim 6 including testing the generated condition bits resulting from said compare operation directly, and
   preventing the setting of the condition register in response to any bits generated by said trap operation.

* * * * *